(No Model.)
J. H. STAMP.
HOLDBACK FOR VEHICLES.
No. 272,492. Patented Feb. 20, 1883.
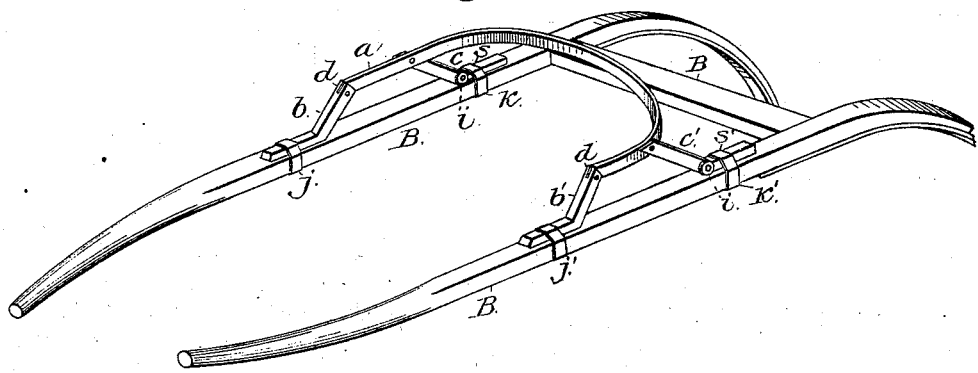
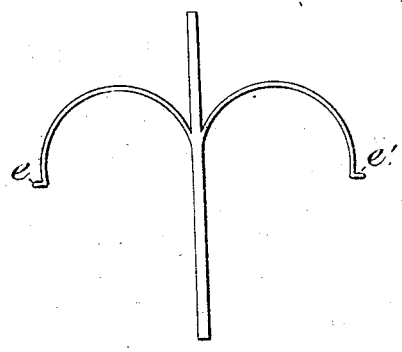
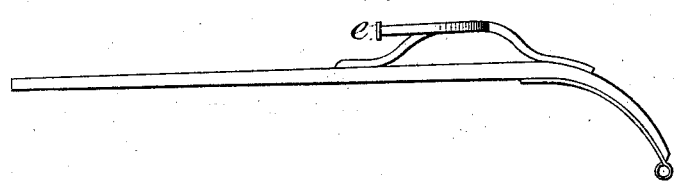
Witnesses:
Inventor:
John H. Stamp

UNITED STATES PATENT OFFICE.

JOHN H. STAMP, OF MOUNT UNION, OHIO.

HOLDBACK FOR VEHICLES.

SPECIFICATION forming part of Letters Patent No. 272,492, dated February 20, 1883.

Application filed September 11, 1882. (No model.)

*To all whom it may concern:*

Be it known that I, JOHN H. STAMP, a citizen of the United States, residing at Mount Union, in the county of Stark and State of Ohio, have invented a new and useful Improvement in Breeching, of which the following is a specification.

My invention relates to improvements in breeching by forming the same out of iron or other suitable material and combining them with the shafts or pole of a vehicle, so as to form a part of the said shafts or pole instead of forming a part of the harness, as heretofore.

In reference to the accompanying drawings, Figure 1 is a perspective view of the invention. Fig. 2 is a top view of the invention as it is used with the pole of a vehicle. Fig. 3 is a side view of the pole of a vehicle with the invention applied. Fig. 4 is a loop through which the trace passes.

Similar letters refer to similar parts throughout the several views.

B is a perspective view of the shafts to which the improved breeching is attached. $a$ is the curved or main portion of the said improved breeching. $b\ b'$ are the parts connected with the shafts to which the front parts of the part $a$ are attached. $d\ d'$ are joints at the upper ends of the part $b\ b'$ and the front end of the part $a$, by which the said parts are united. $s\ s'$ are parts connected with the shafts B at the rear portion of the part $a$, and through the part $c$, connected with the said part $a$.

Figs. 2, 3, and 4 exhibit the form of the breeching when used in connection with the pole of a vehicle, and exhibit a mere change of form without the adjusting-joints, and also exhibit its use in connection with the pole instead of the shafts of a vehicle.

The device may be shifted or adjusted to suit the size of the horse by means of the parts $c\ c'$ and $s\ s$ and the joints $d\ d'$.

The entire device may be moved either backward or forward by means of the clips $j\ j'$ and $k\ k'$.

If it be desired to elevate the rear portion of the said device, the parts $c\ c'\ s\ s'$ are moved toward the front end of the shafts. By this means the angle of the parts $c\ c'$ is changed, and thereby the part $a$ is elevated.

What I claim as my invention, and desire to secure by Letters Patent, is—

1. The combination of the parts $a$ and $b\ b$, connected by pivoted joints $d\ d$, and the shafts B, arranged substantially as described.

2. The combination of the parts $a$ and $b\ b$, connected by pivoted joints $d\ d$, and the parts $c\ c$ and $s\ s$.

JOHN H. STAMP.

Witnesses:
WM. J. KOLP,
S. V. ESSICK.